United States Patent
Singh et al.

(10) Patent No.: US 11,544,425 B2
(45) Date of Patent: Jan. 3, 2023

(54) SYSTEMS AND METHODS FOR EXPEDITING DESIGN OF PHYSICAL COMPONENTS THROUGH USE OF COMPUTATIONALLY EFFICIENT VIRTUAL SIMULATIONS

(71) Applicant: CNH Industrial America LLC, New Holland, PA (US)

(72) Inventors: Samrendra K Singh, Bolingbrook, IL (US); Andrew Brokaw, Elgin, IL (US); Panos Tamamidis, Northbrook, IL (US); Abhijeet Bhalerao, Willowbrook, IL (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 695 days.

(21) Appl. No.: 16/382,699

(22) Filed: Apr. 12, 2019

(65) Prior Publication Data
US 2020/0327204 A1    Oct. 15, 2020

(51) Int. Cl.
| G06F 30/20 | (2020.01) |
| G06N 20/00 | (2019.01) |
| G06F 111/08 | (2020.01) |
| G06F 111/20 | (2020.01) |
| G06F 111/10 | (2020.01) |
| G06F 113/08 | (2020.01) |

(52) U.S. Cl.
CPC ............ *G06F 30/20* (2020.01); *G06N 20/00* (2019.01); *G06F 2111/08* (2020.01); *G06F 2111/10* (2020.01); *G06F 2111/20* (2020.01); *G06F 2113/08* (2020.01)

(58) Field of Classification Search
None
See application file for complete search history.

(56) References Cited

U.S. PATENT DOCUMENTS 3,337,220 A * 8/1967 James ................ A63B 67/14
                                                       273/277
6,088,521 A   7/2000 Strumolo et al.
(Continued)

FOREIGN PATENT DOCUMENTS

| DE | 20203367 | 5/2003 |
| EP | 2600263 | 6/2013 |
| WO | WO2017222829 | 12/2017 |

OTHER PUBLICATIONS

"A zonal Galerkin-free POD model for incompressible flows" by Michel Bergmann et al. (Journal of Computational Physics 352 (2018) 301-325). (Year: 2018).*

(Continued)

*Primary Examiner* — Akash Saxena
(74) *Attorney, Agent, or Firm* — Rickard DeMille; Rebecca Henkel (57) ABSTRACT

The present disclosure provides systems and methods that expedite the design of physical components through the use of iterative and computationally efficient virtual simulations. In particular, the systems and methods of the present disclosure can be used as part of an iterative design process in which a product designer is able to iteratively make changes to a component design by iteratively interacting a visualization of a virtual representation of the component within a virtual environment.

16 Claims, 5 Drawing Sheets

(56) References Cited

U.S. PATENT DOCUMENTS

| | | | |
|---|---|---|---|
| 7,668,705 B2 * | 2/2010 | Kalitzin | G06F 30/23 703/2 |
| 7,761,269 B1 | 7/2010 | Kraal et al. | |
| 7,831,418 B1 | 11/2010 | Sendhoff et al. | |
| 7,912,681 B2 | 3/2011 | Narramore et al. | |
| 8,099,265 B2 * | 1/2012 | Houston | G06T 17/00 703/9 |
| 8,489,373 B2 | 7/2013 | Calmels | |
| 8,504,340 B2 | 8/2013 | Redondo Garcia et al. | |
| 8,706,460 B2 | 4/2014 | Falangas | |
| 8,725,470 B1 | 5/2014 | Brown et al. | |
| 8,781,805 B1 * | 7/2014 | Sachs | G06F 30/20 703/9 |
| 8,789,060 B1 * | 7/2014 | Wadland | G06F 9/52 718/102 |
| 8,996,337 B1 * | 3/2015 | Muller-Fischer | G06T 13/20 703/2 |
| 9,037,440 B2 * | 5/2015 | Sun | G06F 30/23 703/2 |
| 9,317,633 B2 | 4/2016 | Calmels | |
| 9,760,660 B2 | 9/2017 | Spira et al. | |
| 9,898,556 B2 | 2/2018 | Jurkiewicz et al. | |
| 11,295,046 B2 * | 4/2022 | Singh | G06N 20/00 |
| 11,295,050 B2 * | 4/2022 | Negishi | G06F 30/23 |
| 2002/0147573 A1 * | 10/2002 | Miyori | G06F 30/23 703/9 |
| 2005/0021234 A1 * | 1/2005 | Han | E21B 49/00 702/13 |
| 2007/0174032 A1 * | 7/2007 | Tillman | G06F 30/20 703/22 |
| 2008/0062170 A1 * | 3/2008 | Satoh | G06F 30/00 345/420 |
| 2008/0126045 A1 * | 5/2008 | Shan | G06F 30/28 703/9 |
| 2008/0177511 A1 * | 7/2008 | Kamatsuchi | G06F 30/20 703/1 |
| 2010/0185420 A1 * | 7/2010 | Ding | G06F 30/23 703/2 |
| 2012/0173219 A1 * | 7/2012 | Rodriguez | G06F 30/23 703/9 |
| 2012/0310604 A1 | 12/2012 | Bazilevs et al. | |
| 2016/0004801 A1 * | 1/2016 | Natsumeda | G05B 23/0272 703/13 |
| 2016/0238481 A1 | 8/2016 | Brandon et al. | |
| 2017/0076494 A1 | 3/2017 | Gabrys et al. | |
| 2017/0103160 A1 | 4/2017 | Hynes | |
| 2017/0169340 A1 * | 6/2017 | Asente | G06F 30/00 |
| 2017/0309016 A1 * | 10/2017 | Klaiman | A61B 6/4441 |
| 2018/0189999 A1 * | 7/2018 | Angelidis | G06T 15/20 |
| 2019/0050506 A1 * | 2/2019 | Umetani | G06N 3/0454 |
| 2020/0065441 A1 * | 2/2020 | Park | G06F 17/13 |
| 2020/0082537 A1 * | 3/2020 | Chen | G06T 7/73 |
| 2020/0233400 A1 * | 7/2020 | Wright | G06T 7/11 |
| 2020/0302270 A1 * | 9/2020 | Singh | G06N 3/082 |
| 2020/0327204 A1 * | 10/2020 | Singh | G06F 30/20 |
| 2020/0327209 A1 * | 10/2020 | Singh | G06F 30/23 |
| 2020/0364388 A1 * | 11/2020 | Umetani | G06T 19/20 |
| 2021/0311089 A1 * | 10/2021 | Nabi | G01S 17/58 |

OTHER PUBLICATIONS

Autodesk, Augmented Reality, Virtual Reality, and Mixed Reality, May 28, 2018, https://www.autodesk.com/solations/virtual-reality.

Griffin, CNN, "This new virtual reality tool could transform how we design cars," Sep. 17, 2018, https://www.cnn.com/style/article/seymourpowell-virtual-reality-car-design/index.html.

Hu et al. Revista de la Facultad de Ingenieria U.C.V., vol. 32, N°12, pp. 1076-1081, 2017, "Aerodynamic Simulation and Optimization Design of Vehicle ExternalFlow Field based on ANSYS," http://webcache.googleusercontent.com/search?q=cache:6YYHF111eTUJ:revistadelafacultaddeingenieria.com/index.php/ingenieria/article/download/2495/2455+&cd=1&hl=en&ct=clnk&gl=us.

Mutual Mobile, "How VR Makes Design More Efficient," Mar. 21, 2018, https://mutalmobile.com/resources/how-vr-makes-design-more-efficient.

Optis, Customer Focus, "Bentley reinvents the design of future vehicles with Virtual Reality," Jan. 5, 2017, https://www.optics-world.com/Showcase/News-Release/Customer-focus/Bentley-reinvents-the-design-of-future-vehicles-with-Virtual-Reality.

Spears, DesignBoom, "Ford's Virtual Reality Lab Revolutionizes Vehicle Design Process," Jan. 15, 2018, https://www.designboom.com/technology/ford-virtual-reality-lab-vehicle-design-01-15-2017/.

* cited by examiner

SYSTEMS AND METHODS FOR EXPEDITING DESIGN OF PHYSICAL COMPONENTS THROUGH USE OF COMPUTATIONALLY EFFICIENT VIRTUAL SIMULATIONS

FIELD OF THE INVENTION

The present subject matter relates generally to systems for designing physical components and, more particularly, to systems and methods that expedite the design of physical components through the use of iterative virtual simulations in conjunction, for example, with computationally efficient region-based updates and/or machine learning techniques.

BACKGROUND OF THE INVENTION

The advancement of computing technology has greatly accelerated the product development cycle by enabling product designers to simulate the physical properties of physical components (e.g., physical components of automobiles, wind turbines, agricultural vehicles, aircraft, etc.). In particular, whereas in the past new designs for physical components would need to be physically prototyped and tested, computer technologies such as physics simulation engines have allowed engineers to design and test virtual analogues of new physical components in an accelerated manner.

Physics simulation engines typically include computer software that provides an approximate simulation of certain physical systems, such as, as examples, rigid body dynamics (including collision detection), soft body dynamics, and fluid dynamics. Although physics simulation engines can perform a highly precise simulation of a physical system, they do have a number of drawbacks.

In particular, the primary challenge associated with physics simulation engines is that they are computationally intensive/demanding. For example, to, a physics simulation engine may take 24 hours or longer to produce the results of a simulation of the performance of a certain iteration of a product design. Thus, a product designer may be able to only make one change to the product per day and, thus, may need to wait a significant period of time to understand how even minor changes to the product will affect product performance. Furthermore, to achieve even the performance described above, significant amounts of sophisticated computing resources must be acquired and consumed, which may not be practical for the design of certain types of products and/or for simultaneously designing multiple products across an organization.

Accordingly, an improved system that enables more timely and efficient experimentation with different product designs would be welcomed in the technology.

BRIEF DESCRIPTION OF THE INVENTION

Aspects and advantages of the invention will be set forth in part in the following description, or may be obvious from the description, or may be learned through practice of the invention.

One example aspect of the present disclosure is directed to a computer-implemented method for enabling expedited design of physical components. The method includes obtaining, by one or more computing devices, physics simulation data that describes a simulation of one or more physical characteristics of a virtual component within a virtual environment. The virtual component is representative of a physical component. The virtual environment is discretized into a plurality of cells. The physics simulation data comprises a plurality of values respectively associated with the plurality of cells of the virtual environment. The method includes, for each of one or more iterations: receiving, by the one or more computing devices, data descriptive of a change to the virtual component. The method includes, for each of the one or more iterations: generating, by the one or more computing devices, updated physics simulation data using a machine-learned physics prediction model and based on the change to the virtual component. Generating the updated physics simulation data comprises, for each of one or more of the plurality of cells: inputting, by the one or more computing devices, the respective values associated with one or more neighboring cells of the cell into the machine-learned physics prediction model; generating, by the one or more computing devices using the machine-learned physics prediction model, one or more predicted gradients for the cell based on the respective values associated with the one or more neighboring cells of the cell; and determining, by the one or more computing devices, an updated value for the cell based at least in part on the one or more predicted gradients for the cell.

Another example aspect of the present disclosure is directed to a computing system. The computing system includes one or more processors and one or more non-transitory computer-readable media that collectively store instructions that, when executed by the one or more processors, cause the computing system to perform operations. The operations include obtaining physics simulation data that describes a simulation of one or more physical characteristics of a virtual component within a virtual environment, wherein the virtual component is representative of a physical component, the virtual is environment discretized into a plurality of cells, and the physics simulation data comprises a plurality of values respectively associated with the plurality of cells of the virtual environment. The operations include, for each of one or more iterations: receiving data descriptive of a change to the virtual component. The operations include, for each of the one or more iterations: generating updated physics simulation data using a machine-learned physics prediction model and based on the change to the virtual component, wherein generating the updated physics simulation data comprises, for each of one or more of the plurality of cells: inputting the respective values associated with one or more neighboring cells of the cell into the machine-learned physics prediction model, generating, using the machine-learned physics prediction model, one or more predicted gradients for the cell based on the respective values associated with the one or more neighboring cells of the cell; and determining an updated value for the cell based at least in part on the one or more predicted gradients for the cell.

Another example aspect of the present disclosure is directed to one or more non-transitory computer-readable media that collectively store instructions that, when executed by one or more processors, cause the one or more processors to perform operations. The operations include generating, using a physics simulation engine, a plurality of training example pairs, wherein each training example pair comprises a first set of training values produced by the physics simulation engine for training cells of a training virtual environment that includes a training virtual component and a second set of training values produced by the physics simulation engine for the training cells of the training virtual environment after a change to the training virtual component. The operations include, for each of the training cells: inputting the respective training values associated with one or more neighboring training cells of the training cell into a machine-learned physics prediction model; and generating, using the machine-learned physics prediction model, one or more predicted gradients for the training cell based on the respective training values associated with the one or more neighboring training cells of the training cell. The operations include evaluating a loss function that compares the one or more predicted gradients for each training cell to one or more ground truth gradients associated with the training cell, the one or more ground truth gradients based on the first set of training values and the second set of training values. The operations include modifying at least one parameter value of the machine-learned physics prediction model based at least in part on the loss function.

Another example aspect of the present disclosure is directed to a computer-implemented method for enabling expedited design of physical components. The method includes obtaining, by the one or more computing devices, physics simulation data that describes a simulation of one or more physical characteristics of a virtual component within a virtual environment, wherein the virtual component is representative of a physical component, the virtual environment is discretized into a plurality of cells, and the physics simulation data comprises a plurality of values respectively associated with the plurality of cells of the virtual environment. The method includes, for each of one or more iterations: receiving, by the one or more computing devices, data descriptive of a change to the virtual component. The method includes, for each of the one or more iterations: defining, by the one or more computing devices, a plurality of regions within the virtual environment, wherein the plurality of regions comprise at least a first region that contains a first subset of the plurality of cells and a second region that contains a second subset of the plurality of cells, and wherein the second region encompasses the first region. The method includes, for each of the one or more iterations: generating, by the one or more computing devices, updated physics simulation data for each of the first subset of cells contained in the first region. The method includes, for each of the one or more iterations: determining, by the one or more computing devices, whether an additional change has been made to the virtual component. The method includes, for each of the one or more iterations: when it is determined that the additional change has not been made to the virtual component and after completion of said generating updated physics simulation data for each of the first subset of cells contained in the first region: generating, by the one or more computing devices, updated physics simulation data for, at least, each of the second subset of cells contained in the second region but not contained in the first region.

Another example aspect of the present disclosure is directed to a computing system. The computing system includes one or more processors and one or more non-transitory computer-readable media that collectively store instructions that, when executed by the one or more processors, cause the computing system to perform operations. The operations include obtaining physics simulation data that describes a simulation of one or more physical characteristics of a virtual component within a virtual environment, wherein the virtual component is representative of a physical component, the virtual environment is discretized into a plurality of cells, and the physics simulation data comprises a plurality of values respectively associated with the plurality of cells of the virtual environment. The operations include, for each of one or more iterations: receiving data descriptive of a change to the virtual component. The operations include, for each of the one or more iterations: defining a plurality of regions within the virtual environment, wherein the plurality of regions comprise at least a first region that contains a first subset of the plurality of cells and a second region that contains a second subset of the plurality of cells, and wherein the second region encompasses the first region. The operations include, for each of the one or more iterations: generating updated physics simulation data for each of the first subset of cells contained in the first region. The operations include, for each of the one or more iterations: determining whether an additional change has been made to the virtual component prior to completion of said generating updated physics simulation data for each of the first subset of cells contained in the first region. The operations include, for each of the one or more iterations: when it is determined that the additional change has not been made to the virtual component prior to completion of said generating updated physics simulation data for each of the first subset of cells contained in the first region: generating updated physics simulation data for, at least, each of the second subset of cells contained in the second region but not contained in the first region.

Another example aspect of the present disclosure is directed to one or more non-transitory computer-readable media that collectively store instructions that, when executed by one or more processors, cause the one or more processors to perform operations. The operations include obtaining physics simulation data that describes a simulation of one or more physical characteristics of a virtual component within a virtual environment, wherein the virtual component is representative of a physical component, the virtual environment is discretized into a plurality of cells, and the physics simulation data comprises a plurality of values respectively associated with the plurality of cells of the virtual environment. The operations include, for each of one or more iterations: receiving data descriptive of a change to the virtual component. The operations include, for each of the one or more iterations: defining a plurality of regions within the virtual environment, wherein the plurality of regions comprise at least a first region that contains a first subset of the plurality of cells and a second region that contains a second subset of the plurality of cells, and wherein the second region encompasses the first region. The operations include, for each of the one or more iterations: generating updated physics simulation data for each of the first subset of cells contained in the first region. The operations include, for each of the one or more iterations: determining whether an additional change has been made to the virtual component prior to completion of said generating updated physics simulation data for each of the first subset of cells contained in the first region. The operations include, for each of the one or more iterations: when it is determined that the additional change has not been made to the virtual component prior to completion of said generating updated physics simulation data for each of the first subset of cells contained in the first region: generating updated physics simulation data for, at least, each of the second subset of cells contained in the second region but not contained in the first region.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Overview

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods that expedite the design of physical components through the use of iterative design input and virtual simulations. In particular, the systems and methods of the present disclosure can be used as part of an iterative design process in which a product designer is able to iteratively make changes to a component design by interacting a visualization of a virtual representation of the component within a virtual environment. At each iteration, in response to the change to the design, a computing system can update some or all of a set of physics simulation data that describes a simulation of one or more physical characteristics of the virtual component within the virtual environment.

More specifically, aspects of the present disclosure are directed to computationally efficient update techniques which enable this iterative design change and feedback process to occur in near-real-time, as opposed to the once-per-day approach currently enabled by physics simulation engines. Enabling iterative design in near-real-time expedites the design process significantly by enabling the product design to quickly and continuously experiment with and understand how changes to the product design will impact product performance. This also enables more successful design as a larger number of different designs overall can be tested.

In particular, according to one aspect of the present disclosure, at each iteration, a computing system can perform updates to a set of physics simulation data according to a computationally efficient region-based approach. That is, instead of attempting to update the entire set of physics simulation data associated with the entire virtual environment, the computing system can instead progressively update a number of smaller regions (e.g., concentrically expanding regions), as time and computational resource availability permit. For example, the computing system can update a first, smallest region and then, if sufficient computing resources are available and/or a new change has not been entered into the system, the computing system may then update a second region (e.g., which may encompass the first region).

In some implementations, the respective size of each region can be determined based on the availability of computational resources (e.g., processor availability and/or memory availability) and/or a frequency at which the user is changing the virtual component. For example, if the user is changing the virtual component at a relatively higher frequency and/or relatively fewer computational resources are available, then the update region(s) can be determined to be relatively smaller to account for the dynamic changes and/or reduced resource availability. Likewise, as the user reduces the frequency of the changes and/or the computational resources become available, the update radius would increase accordingly.

According to another aspect of the present disclosure, machine learning techniques can be used to generate machine-learned models which are capable of quickly and efficiently predicting changes to the physics simulation data. For example, machine-learned models can be used which are capable of doing regression type predictions. In one example, a machine-learned model can be trained to predict one or more gradients for a cell based on the values associated with its neighboring cells. An updated value for the cell can be determined based on the one or more predicted gradients.

More particularly, in some implementations, the iterative process can start with the use (e.g., single use) of a powerful physics simulation engine to generate physics simulation data that describes a simulation one or more physical characteristics of a virtual component within a virtual environment, wherein the virtual component is representative of a physical component. Thereafter, each iteration of design change and evaluation can be performed using a much more computationally efficient approach.

In some implementations, the virtual environment can be discretized into a plurality of cells. As one example, the virtual environment can be two-dimensional and the cells can be two-dimensional cells (e.g., square pixels). As another example, the virtual environment can be three-dimensional (e.g., Cartesian space) and the cells can be three-dimensional cells (e.g., cubic voxels). The cells can be uniformly sized within the space or can be varying sizes across the space. For example, cell size can be positively correlated to distance from a surface of the virtual component such that cells closer to the virtual component are smaller in size and vice versa. The cells can be any shape such as squares/cubes, circles/spheres, polygonal mesh cells, arbitrary and non-uniform shapes, etc. The cells can remain fixed through the iterative process or the virtual space can be dynamically re-discretized during the iterative process.

The physics simulation data can be associated with the virtual environment and can describe various simulated physical characteristics (e.g., properties, behaviors, and/or the like) within the virtual environment. As one example, the physics simulation data can be or describe a fluid flow field that describes a flow of a fluid (e.g., a gas or a liquid) within the virtual environment (e.g., about the virtual component). For example, a fluid flow field can be generated by simulating computational fluid dynamics (CFD) (e.g., relative to a virtual vehicle exhaust component). As other examples, the physics simulation data can be or describe stress experienced by the virtual component; strain experienced by the virtual component; an electrical field within the virtual environment; a magnetic field within the virtual environment; thermal transfer associated with the virtual environment; chemical reactions within the virtual environment; and/or other physical phenomena, behaviors, properties, and/or the like.

The physics simulation data can also be discretized according to the cells of the virtual environment. For example, the physics simulation data can provide one or more values for each of the cells of the virtual environment. The value(s) at each cell of the virtual environment can correspond to the simulated physical characteristics at such cell. As one example, for a fluid flow field, the value(s) at each cell can include or be represented within a vector that describes a magnitude and direction of flow at such cell (e.g., within three-dimensions). In some implementations, the physics simulation data can be discretized when provided as an output of the physics simulation engine. In other implementations, the physics simulation data can be continuous when provided as an output of the physics simulation engine and can be discretized into the plurality of cells when first imported into a visualization system.

The virtual environment and the physics simulation data can be visualized for a user to view. As examples, the physics simulation data can be visualized using vectors, streamlines, traces, contours, coloration, and/or other visual indicators. In one example, the visualization can be provided on a display screen, such as a display screen associated with a laptop computer, desktop computer, television screen, and/or the like. In another example, the visualization can be provided within a virtual reality system. For example, the visualization can be provided to the user using virtual reality technology such as a virtual reality room, virtual reality headset, and/or the like. When using virtual reality technology, the user may be able to physically move in the real world to view the virtual component from different perspectives in the virtual environment.

The user can interact with the visualization to change an aspect of virtual component. For example, the user can use various user input components such as a mouse, keyboard, joystick, controller, glove with sensors, etc. to provide a user input that causes a change in the virtual component. As one example, in a virtual reality visualization, the user can directly interact with the visualization in the virtual environment. For example, the user can make hand movements to grab and pull, spin, touch, poke, or otherwise virtually interact with the virtual object. The user's hand movements can be sensed using cameras, motion sensors, accelerometers, RADAR, and/or other sensors (e.g., in combination with computer vision or other sensor processing techniques).

The change to the virtual component can be any type of change to the virtual component. In one example, the change to the virtual component can be a modification to a size and/or shape of the virtual component. For example, the change can be a modification to an exterior surface of the virtual component. In another example, the change to the virtual component can be a modification to a material type of some or all of the virtual component. In yet other examples, the change to the virtual component can be a modification to various other attributes of the virtual component such as connections between components, orientation of the component, etc.

According to aspects of the present disclosure, the computing system can efficiently update the physics simulation data based on the received change to the virtual component. For example, in some implementations, the computing system can define a plurality of regions within the virtual environment. As an example, the plurality of regions can include at least a first region that contains a first subset of the plurality of cells and a second region that contains a second subset of the plurality of cells. In some implementations, the second region may encompass (e.g., surround) the first region. The computing system can progressively update each of the plurality of regions, as time and/or computing resources permit.

In some implementations, the respective size of each region can be determined based on the availability of computational resources (e.g., processor availability and/or memory availability) and/or a frequency at which the user is changing the virtual component. For example, if the user is changing the virtual component at a relatively higher frequency and/or relatively fewer computational resources are available, then the update region(s) can be determined to be relatively smaller to account for the dynamic changes and/or reduced resource availability. Likewise, as the user reduces the frequency of the changes and/or the computational resources become available, the update radius would increase accordingly.

The respective regions can be overlapping and/or non-overlapping. The regions can be concentric or non-concentric. The regions can be any shape such as squares/cubic, circular/spherical, arbitrary and non-uniform shapes, etc. The regions can share a centroid or can have different centroids. All of the regions can be defined at once or defining the regions can include respectively defining the regions at different times (e.g., the second is defined after completion of updating the first).

In some implementations, the location and/or size of the regions can be based on the location and/or size of the change to the virtual component. For example, the regions (e.g., the first region) can be centered about a respective location at which the change to the virtual component occurred. In some implementations, the shape and/or sequence of update of the regions can be based on a direction associated with the physics simulation. For example, for the simulation of flow of fluid, the regions can include relatively more cells that the located in a downstream direction from the location at which the change to the virtual component occurred versus cells that are located in an upstream direction from the location of change. Regions and/or cells located in a relatively more upstream direction can be updated before regions located in a relatively more downstream direction.

In some implementations, updating the physics simulation data can include first modifying the virtual object and/or virtual environment based on the change to the virtual object. As one example, this process can include identifying a plurality of boundary cells associated with an updated exterior of the virtual component after the change to the virtual component and associating normal information with each of the plurality of boundary cells. As another example, updating the virtual environment based on the change to the virtual object can include identifying a plurality of bounded cells that are bounded within the updated exterior of the virtual component after the change to the virtual component and setting, by the one or more computing devices, the value for each of the plurality of bounded cells equal to zero. For example, in a fluid flow analysis, cells bounded within the exterior of the virtual component will be expected to experience zero fluid flow.

After optionally modifying the virtual environment to account for the change, the computing system can generate updated physics simulation data for each of the first subset of cells contained in the first region. For example, various highly efficient processing techniques can be performed to generate the updated physics simulation data. In one example, machine learning techniques can be used to generate machine-learned models which are capable of quickly and efficiently predicting changes to the physics simulation data. For example, machine-learned models can be used which are capable of doing regression type predictions.

In one example, a machine-learned physics prediction model can be trained to predict one or more gradients for a cell based on the values associated with its neighboring cells. Thus, in some implementations, determining the updated physics simulation data for each cell can include: inputting the respective values associated with one or more neighboring cells of the cell into a machine-learned physics prediction model and generating, using the machine-learned physics prediction model, one or more predicted gradients for the cell based on the respective values associated with the one or more neighboring cells of the cell.

The neighboring cells can include some or all of the cells that are adjacent to the cell being predicted. For example, a cubic cell can have at least 6 neighbors while a square cell can have at least four neighbors. As further examples, the neighboring cells for a particular cell can be defined as any cells within some threshold distance of the particular cell. The values of the neighboring cells can be input into the machine-learned physics prediction model according to an input structure that informs the model of the spatial nature of the neighboring cells relative to the cell being predicted.

In some implementations, the gradient(s) predicted by the machine-learned physics prediction model for the cell can be a spatial gradient of the one or more properties represented by the physics simulation data (e.g., velocity, temperature, and/or the like). Such a gradient can typically be calculated by taking the difference of values between a neighboring cell and the cell under consideration and dividing it by the distance between the center of the two cells. Thus, the machine-learned model can learn based on the spatial gradients with respect to some or all of the neighboring cells. Then, when it is desired to determine an updated value for a cell, the machine-learned model can predict one or more gradients relative to the one or more neighboring cells. For example, a single gradient can be predicted for the cell relative to all neighbors or a different gradient can be predicted for the cell relative to each neighboring cell for which a value is provided.

The computing system can determine an updated value for the cell based on the one or more predicted gradients. In one example, an updated value for the cell can be determined by taking the current value in the cell minus the predicted gradient multiplied by the distance between the cell centers multiplied by an under-relation factor (which may also be referred to as a learning rate). The learning rate can be fixed or can be adaptive. In some implementations, the final updated value for the cell can be the average of respective updated values determined using the respective gradient predicted relative to each of the neighboring cells. Other different update functions can be used as well in addition or alternatively to example function described above.

Thus, a machine-learned model or other physics data prediction technique can be used to generate updated values for each of the cells included in the first region. Thereafter, assuming that an additional change has not yet been made to the virtual component and that sufficient compute resources are available, the computing system can then proceed to generate updated physics simulation data for the second region. For example, at this stage, the computing system can determine data for only the cells included in the second set of cells but not the first set of cells (e.g., only those cells of the second region that were not included in the first region). Likewise, after the second region has been completed, and assuming that an additional change has not yet been made to the virtual component and that sufficient compute resources are available, the computing system can then proceed to generate updated physics simulation data for a third region, and so on.

In such fashion, instead of attempting to update the entire set of physics simulation data associated with the entire virtual environment at once the computing system can instead progressively update a number of smaller regions (e.g., concentrically expanding regions), as time and computational resource availability permit. This enables a more efficient and dynamically appropriate use of computing resources.

With reference now to the figures, example embodiments of the present disclosure will be discussed in additional detail.

Example Devices and Systems

Figure 1:
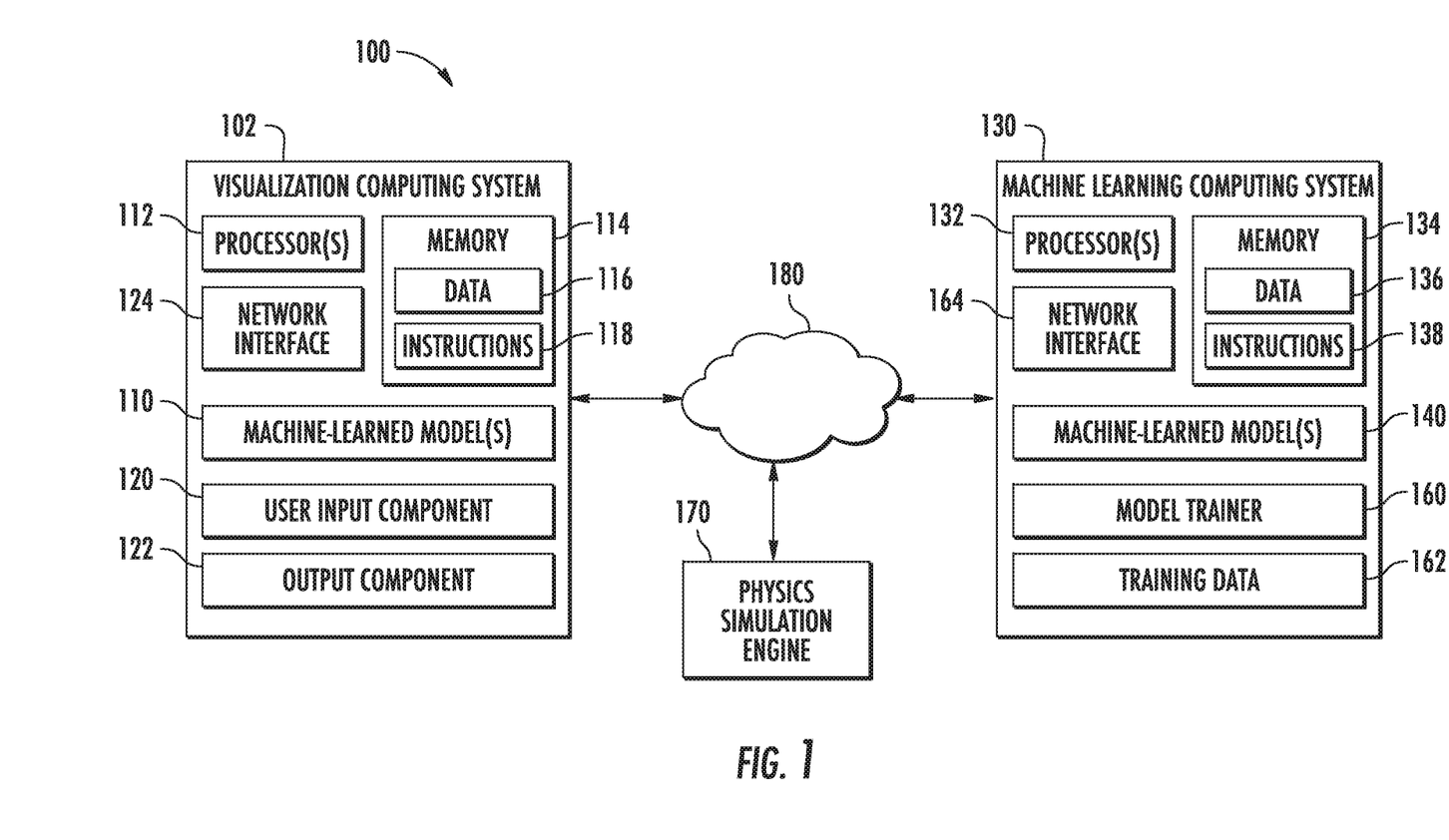
FIG. 1 illustrates a block diagram of an example computing system in accordance with aspects of the present subject matter.

FIG. 1 depicts an example computing system 100 for iterative product design and simulation according to example embodiments of the present disclosure. The example system 100 includes a visualization computing system 102, a physics simulation engine 170, and a machine learning computing system 130 that are communicatively coupled over a network 180.

The visualization computing system 102 can include one or more computing device such as laptop computers, desktop computers, embedding computing devices, gaming consoles, handheld computing devices (e.g., smartphones) virtual reality systems, and/or other computing devices.

The visualization computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage media, such as RAM, ROM, EEPROM, EPROM, one or more memory devices, flash memory devices, etc., and combinations thereof.

The memory 114 can store information that can be accessed by the one or more processors 112. For instance, the memory 114 (e.g., one or more non-transitory computer-readable storage mediums, memory devices) can store data 116 that can be obtained, received, accessed, written, manipulated, created, and/or stored. In some implementations, the visualization computing system 102 can obtain data from one or more memory device(s) that are remote from the system 102.

The memory 114 can also store computer-readable instructions 118 that can be executed by the one or more processors 112. The instructions 118 can be software written in any suitable programming language or can be implemented in hardware. Additionally, or alternatively, the instructions 118 can be executed in logically and/or virtually separate threads on processor(s) 112.

For example, the memory 114 can store instructions 118 that when executed by the one or more processors 112 cause the one or more processors 112 to perform any of the operations and/or functions described herein.

According to an aspect of the present disclosure, the visualization computing system 102 can store or include one or more machine-learned models 110. For example, the models 110 can be or can otherwise include various machine-learned models such as a random forest classifier; a logistic regression classifier; a kernel ridge regression model; a Bayesian ridge regression; a support vector machine; one or more decision trees; a neural network; and/or other types of models including both linear models and non-linear models. Example neural networks include feed-forward neural networks, recurrent neural networks (e.g., long short-term memory recurrent neural networks), convolutional neural networks, or other forms of neural networks.

In some implementations, the visualization computing system 102 can receive the one or more machine-learned models 110 from the machine learning computing system 130 over network 180 and can store the one or more machine-learned models 110 in the memory 114. The visualization computing system 102 can then use or otherwise implement the one or more machine-learned models 110 (e.g., by processor(s) 112).

The machine learning computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage media, such as RAM, ROM, EEPROM, EPROM, one or more memory devices, flash memory devices, etc., and combinations thereof.

The memory 134 can store information that can be accessed by the one or more processors 132. For instance, the memory 134 (e.g., one or more non-transitory computer-readable storage mediums, memory devices) can store data 136 that can be obtained, received, accessed, written, manipulated, created, and/or stored. In some implementations, the machine learning computing system 130 can obtain data from one or more memory device(s) that are remote from the system 130.

The memory 134 can also store computer-readable instructions 138 that can be executed by the one or more processors 132. The instructions 138 can be software written in any suitable programming language or can be implemented in hardware. Additionally, or alternatively, the instructions 138 can be executed in logically and/or virtually separate threads on processor(s) 132.

For example, the memory 134 can store instructions 138 that when executed by the one or more processors 132 cause the one or more processors 132 to perform any of the operations and/or functions described herein.

In some implementations, the machine learning computing system 130 includes one or more server computing devices. If the machine learning computing system 130 includes multiple server computing devices, such server computing devices can operate according to various computing architectures, including, for example, sequential computing architectures, parallel computing architectures, or some combination thereof.

In addition or alternatively to the model(s) 110 at the visualization computing system 102, the machine learning computing system 130 can include one or more machine-learned models 140. For example, the models 140 can be or can otherwise include various machine-learned models such as a random forest classifier; a logistic regression classifier; a kernel ridge regression model; a Bayesian ridge regression; a support vector machine; one or more decision trees; a neural network: and/or other types of models including both linear models and non-linear models. Example neural networks include feed-forward neural networks, recurrent neural networks (e.g., long short-term memory recurrent neural networks), convolutional neural networks, or other forms of neural networks.

As an example, the machine learning computing system 130 can communicate with the visualization computing system 102 according to a client-server relationship. For example, the machine learning computing system 140 can implement the machine-learned models 140 to provide a data update service to the visualization computing system 102.

Thus, machine-learned models 110 can located and used at the visualization computing system 102 and/or machine-learned models 140 can be located and used at the machine learning computing system 130.

In some implementations, the machine learning computing system 130 and/or the visualization computing system 102 can train the machine-learned models 110 and/or 140 through use of a model trainer 160. The model trainer 160 can train the machine-learned models 110 and/or 140 using one or more training or learning algorithms. One example training technique is backwards propagation of errors ("backpropagation").

In some implementations, the model trainer 160 can perform supervised training techniques using a set of labeled training data. In other implementations, the model trainer 160 can perform unsupervised training techniques using a set of unlabeled training data. The model trainer 160 can perform a number of generalization techniques to improve the generalization capability of the models being trained. Generalization techniques include weight decays, dropouts, or other techniques.

In particular, the model trainer 160 can train a machine-learned model 110 and/or 140 based on a set of training data 162. The model trainer 160 can be implemented in hardware, software, firmware, or combinations thereof. Example training data 162 and training techniques are described with reference to FIG. 7.

The visualization computing system 102 can also include a network interface 124 used to communicate with one or more systems or devices, including systems or devices that are remotely located from the visualization computing system 102. The network interface 124 can include any circuits, components, software, etc. for communicating with one or more networks (e.g., 180). In some implementations, the network interface 124 can include, for example, one or more of a communications controller, receiver, transceiver, transmitter, port, conductors, software and/or hardware for communicating data. Similarly, the machine learning computing system 130 can include a network interface 164.

The visualization computing system 102 can also include a user input component 120. For example, the user input component 120 can include a microphone, a keypad, a keyboard, a click-wheel, buttons, a joystick, a controller, and/or a touch-sensitive screen. The user input component 120 can also include components that use computer vision or other sensor data processing techniques to infer user inputs from imagery or other sensor data.

The visualization computing system 102 can also include an output component 122. For example, the output component 122 can include a speaker, a haptic output component, and/or a display. In one example, the display can be a head-mounted display used as part of a virtual reality system.

The system 100 can further include a physics simulation engine 170 that is communicatively coupled to the network 180. The physics simulation engine 170 can be or include computer software and/or hardware that provides an approximate simulation of certain physical systems, such as, as examples, rigid body dynamics (including collision detection), soft body dynamics, and fluid dynamics.

The network(s) 180 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a network interface using any type of protocol, protection scheme, encoding, format, packaging, etc.

FIG. 1 illustrates one example computing system 100 that can be used to implement the present disclosure. Other computing systems can be used as well. For example, in some implementations, the visualization computing system 102 can include the model trainer 160 and the training dataset 162. In such implementations, the machine-learned models 110 can be both trained and used locally at the visualization computing system 102. As another example, in some implementations, the visualization computing system 102 is not connected to other computing systems.

Example Virtual Environments

Figure 2:
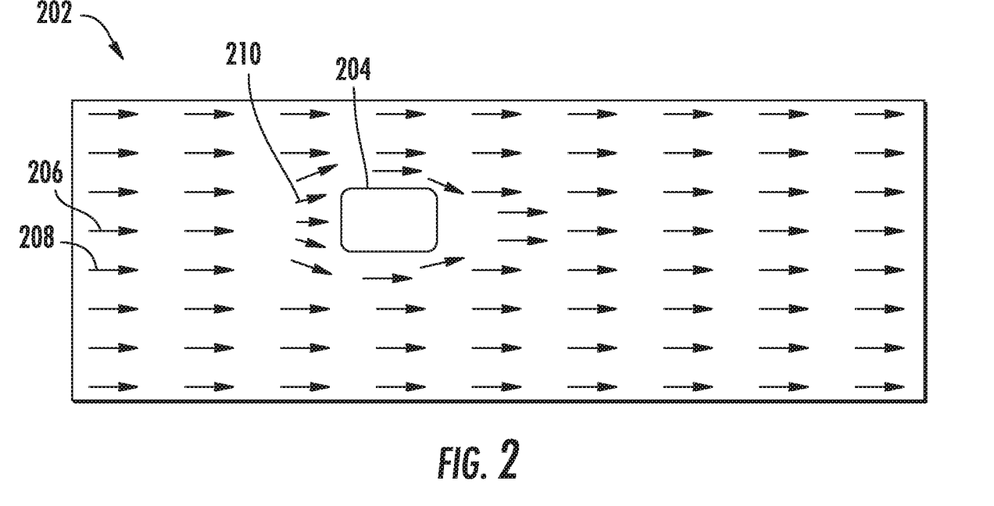
FIG. 2 illustrates a graphical diagram of an example visualization of a virtual environment in accordance with aspects of the present subject matter.

FIG. 2 illustrates a graphical diagram of an example visualization 202 of a virtual environment in accordance with aspects of the present subject matter. The visualization 202 depicts a virtual object 204 within the virtual environment. The visualization 202 includes number of graphical elements that correspond to vectors of physics simulation data. For example, in the illustrated example, vectors 206, 208, and 210 correspond to the simulated flow of a fluid within the virtual environment and about the virtual object 204. Each of the vectors 206, 208, and 210 may correspond to one cell within the virtual environment.

Figure 3:
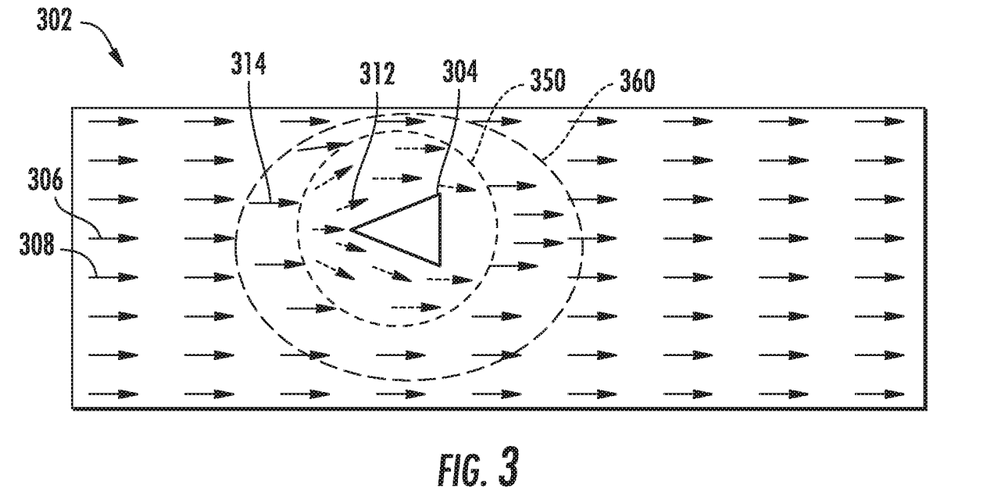
FIG. 3 illustrates a graphical diagram of an example visualization of a virtual environment including concentric update regions in accordance with aspects of the present subject matter.

FIG. 3 illustrates a graphical diagram of an example visualization 302 of a virtual environment including concentric update regions in accordance with aspects of the present subject matter. In particular, relative to the visualization 202 of FIG. 2, in the visualization 302 of FIG. 3, the shape of the virtual object has been changed to a new virtual object 304.

Two update regions are shown in FIG. 3. A first update region 350 encompasses the virtual object 304 and includes vector 312 (and its corresponding cell). A second update region 360 encompasses the first update region 350 and includes vector 314 (and its corresponding cell). Vectors 306 and 308 are not included in either of the regions 350 or 360.

According to an aspect of the present disclosure, an efficient computation scheme can first update the data contained in the first region 350 (e.g., vector 312) and then, subsequently and if appropriate, update the data in the second region 360 (e.g., vector 314).

Example Methods

Figure 4:
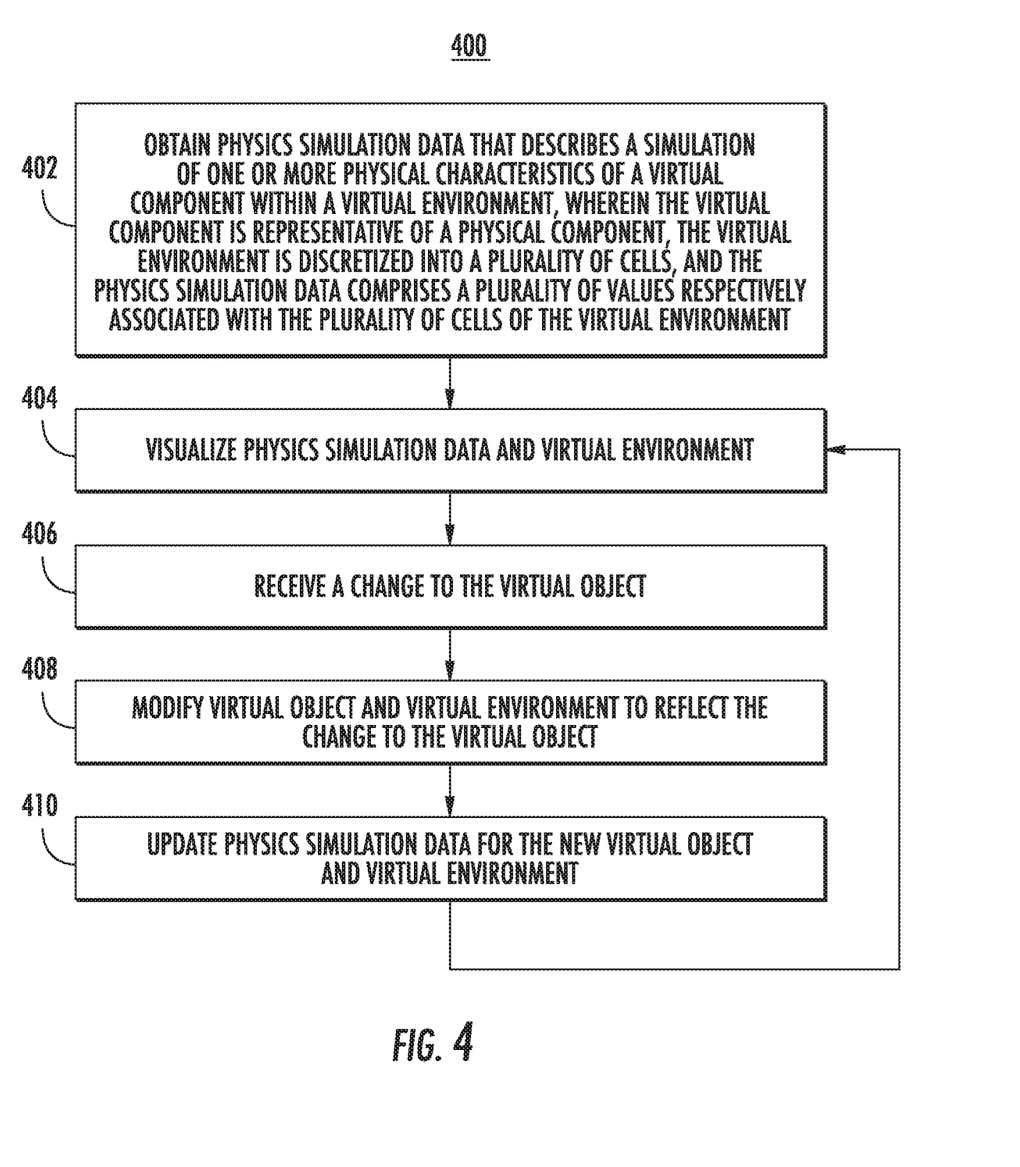
FIG. 4 illustrates a flow chart diagram of an example method for iterative virtual simulation and visualization in accordance with aspects of the present subject matter.

FIG. 4 illustrates a flow chart diagram of an example method 400 for iterative virtual simulation and visualization in accordance with aspects of the present subject matter.

At 402, a computing system can obtain physics simulation data that describes a simulation of one or more physical characteristics of a virtual object within a virtual environment. The virtual object can be representative of a physical component.

As one example, at 402, method 400 can start by obtaining data generated through the use (e.g., single use) of a powerful physics simulation engine to generate physics simulation data that describes a simulation one or more physical characteristics of the virtual component within the virtual environment. Thereafter, each iteration of design change and evaluation can be performed using a much more computationally efficient approach.

In some implementations, the virtual environment can be discretized into a plurality of cells. As one example, the virtual environment can be two-dimensional and the cells can be two-dimensional cells (e.g., square pixels). As another example, the virtual environment can be three-dimensional (e.g., Cartesian space) and the cells can be three-dimensional cells (e.g., cubic voxels). The cells can be uniformly sized within the space or can be varying sizes across the space. For example, cell size can be positively correlated to distance from a surface of the virtual component such that cells closer to the virtual component are smaller in size and vice versa. The cells can be any shape such as squares/cubes, circles/spheres, polygonal mesh cells, arbitrary and non-uniform shapes, etc. The cells can remain fixed through the iterative process or the virtual space can be dynamically re-discretized during the iterative process.

The physics simulation data can be associated with the virtual environment and can describe various simulated physical characteristics (e.g., properties, behaviors, and/or the like) within the virtual environment. As one example, the physics simulation data can be or describe a fluid flow field that describes a flow of a fluid (e.g., a gas or a liquid) within the virtual environment (e.g., about the virtual component). For example, a fluid flow field can be generated by simulating computational fluid dynamics (CFD) (e.g., relative to a virtual vehicle exhaust component). As other examples, the physics simulation data can be or describe stress experienced by the virtual component; strain experienced by the virtual component; an electrical field within the virtual environment; a magnetic field within the virtual environment; thermal transfer associated with the virtual environment; chemical reactions within the virtual environment; and/or other physical phenomena, behaviors, properties, and/or the like.

The physics simulation data can also be discretized according to the cells of the virtual environment. For example, the physics simulation data can provide one or more values for each of the cells of the virtual environment. The value(s) at each cell of the virtual environment can correspond to the simulated physical characteristics at such cell. As one example, for a fluid flow field, the value(s) at each cell can include or be represented within a vector that describes a magnitude and direction of flow at such cell (e.g., within three-dimensions). In some implementations, the physics simulation data can be discretized when provided as an output of the physics simulation engine. In other implementations, the physics simulation data can be continuous when provided as an output of the physics simulation engine and can be discretized into the plurality of cells when first imported into a visualization system.

At 404, the computing system can visualize the physics simulation data and the virtual environment. As examples, the physics simulation data can be visualized using vectors, streamlines, traces, contours, coloration, and/or other visual indicators. In one example, the visualization can be provided on a display screen, such as a display screen associated with a laptop computer, desktop computer, television screen, and/or the like. In another example, the visualization can be provided within a virtual reality system. For example, the visualization can be provided to the user using virtual reality technology such as a virtual reality room, virtual reality headset, and/or the like. When using virtual reality technology, the user may be able to physically move in the real world to view the virtual component from different perspectives in the virtual environment.

At 406, the computing system can receive a change to the virtual object. As an example, the user can interact with the visualization to change an aspect of virtual component. For example, the user can use various user input components such as a mouse, keyboard, joystick, controller, glove with sensors, etc. to provide a user input that causes a change in the virtual component. As one example, in a virtual reality visualization, the user can directly interact with the visualization in the virtual environment. For example, the user can make hand movements to grab and pull, spin, touch, poke, or otherwise virtually interact with the virtual object. The user's hand movements can be sensed using cameras, motion sensors, accelerometers. RADAR, and/or other sensors (e.g., in combination with computer vision or other sensor processing techniques).

The change to the virtual component can be any type of change to the virtual component. In one example, the change to the virtual component can be a modification to a size and/or shape of the virtual component. For example, the change can be a modification to an exterior surface of the virtual component. In another example, the change to the virtual component can be a modification to a material type of some or all of the virtual component. In yet other examples, the change to the virtual component can be a modification to various other attributes of the virtual component such as connections between components, orientation of the component, etc.

At 408, the computing system can modify the virtual object and/or the virtual environment to reflect the change to the virtual object. As one example, block 408 can include identifying a plurality of boundary cells associated with an updated exterior of the virtual component after the change to the virtual component and associating normal information with each of the plurality of boundary cells. As another example, modifying the virtual environment based on the change to the virtual object can include identifying a plurality of bounded cells that are bounded within the updated exterior of the virtual component after the change to the virtual component and setting, by the one or more computing devices, the value for each of the plurality of bounded cells equal to zero. For example, in a fluid flow analysis, cells bounded within the exterior of the virtual component will be expected to experience zero fluid flow.

Figure 5:
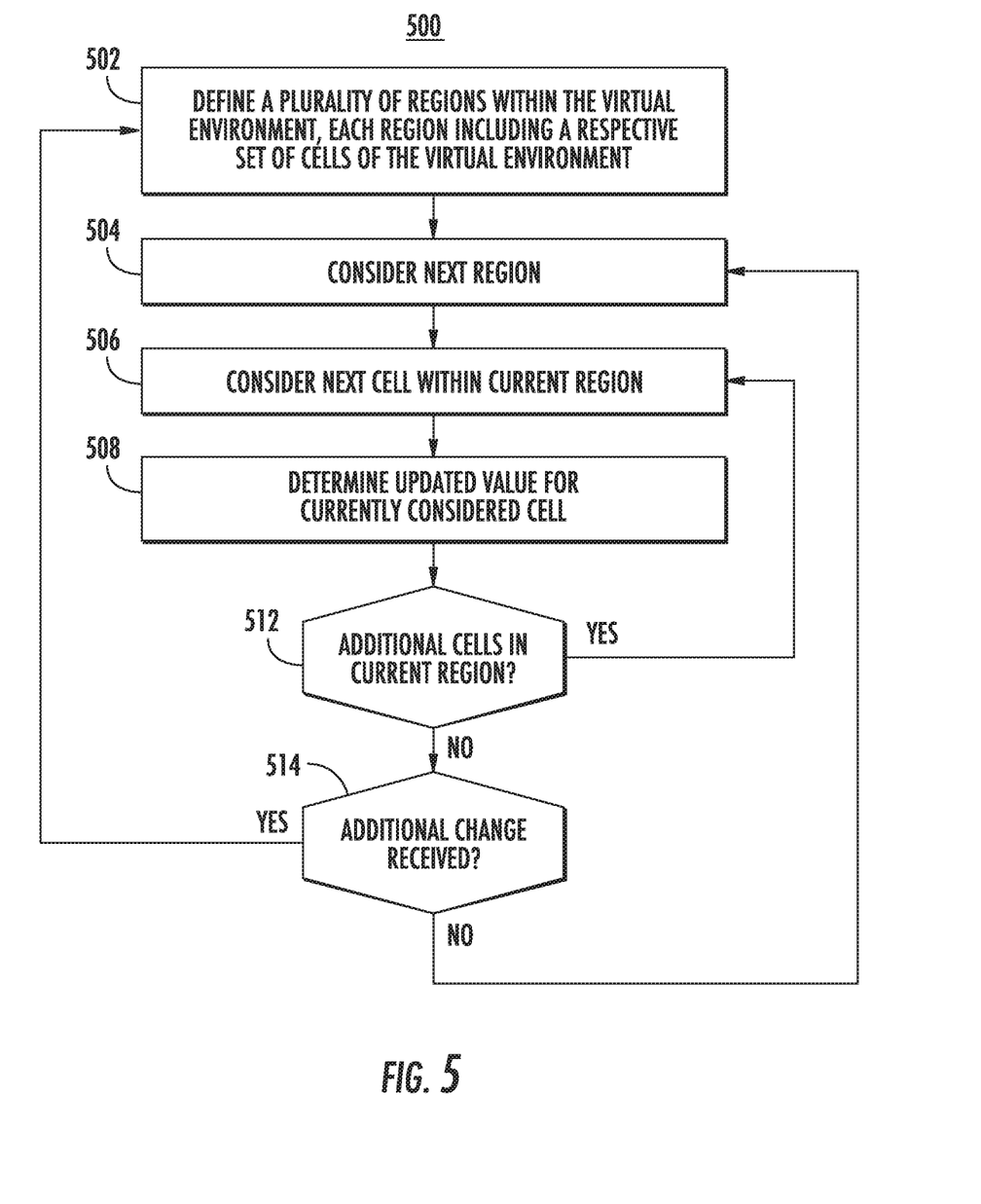
FIG. 5 illustrates a flow chart diagram of an example method for computationally-efficient region-based updating in accordance with aspects of the present subject matter.

At 410, the computing system can update the physics simulation data for the new virtual object and virtual environment. For example, various highly efficient processing techniques can be performed to generate the updated physics simulation data. In one example, machine learning techniques can be used to generate machine-learned models which are capable of quickly and efficiently predicting changes to the physics simulation data. For example, machine-learned models can be used which are capable of doing regression type predictions. FIG. 5 shows one example method for updating physics simulation data in a computationally efficient manner.

Referring still to FIG. 4, after 410, method 400 can return to block 404 and again visualize the updated physics simulation data and virtual environment. Thus, method 400 can provide an iterative design change and update cycle for virtual design of physical components.

FIG. 5 illustrates a flow chart diagram of an example method 500 for computationally-efficient region-based updating in accordance with aspects of the present subject matter;

At 502, a computing system can define a plurality of regions within the virtual environment. Each region can include a respective set of cells of the virtual environment.

As an example, the plurality of regions can include at least a first region that contains a first subset of the plurality of cells and a second region that contains a second subset of the plurality of cells. In some implementations, the second region may encompass (e.g., surround) the first region. The computing system can progressively update each of the plurality of regions, as time and/or computing resources permit.

In some implementations, the respective size of each region can be determined based on the availability of computational resources (e.g., processor availability and/or memory availability) and/or a frequency at which the user is changing the virtual component. For example, if the user is changing the virtual component at a relatively higher frequency and/or relatively fewer computational resources are available, then the update region(s) can be determined to be relatively smaller to account for the dynamic changes and/or reduced resource availability. Likewise, as the user reduces the frequency of the changes and/or the computational resources become available, the update radius would increase accordingly.

The respective regions can be overlapping and/or non-overlapping. The regions can be concentric or non-concentric. The regions can be any shape such as squares/cubic, circular/spherical, arbitrary and non-uniform shapes, etc. The regions can share a centroid or can have different centroids. All of the regions can be defined at once or defining the regions can include respectively defining the regions at different times (e.g., the second is defined after completion of updating the first).

In some implementations, the location and/or size of the regions can be based on the location and/or size of the change to the virtual component. For example, the regions (e.g., the first region) can be centered about a respective location at which the change to the virtual component occurred. In some implementations, the shape and/or sequence of update of the regions can be based on a direction associated with the physics simulation. For example, for the simulation of flow of fluid, the regions can include relatively more cells that the located in a downstream direction from the location at which the change to the virtual component occurred versus cells that are located in an upstream direction from the location of change. Regions and/or cells located in a relatively more upstream direction can be updated before regions located in a relatively more downstream direction.

At 504, the computing system can consider the next region. For example, at the first instance of 504, the first region can be considered. At 506, the computing system can consider the next cell within the current region.

At 508, the computing system can determine an updated value for the currently considered cell. In one example, a machine-learned physics prediction model can be trained to predict one or more gradients for a cell based on the values associated with its neighboring cells. Thus, in some implementations, determining the updated physics simulation data for each cell can include: inputting the respective values associated with one or more neighboring cells of the cell into a machine-learned physics prediction model and generating, using the machine-learned physics prediction model, one or more predicted gradients for the cell based on the respective values associated with the one or more neighboring cells of the cell.

The neighboring cells can include some or all of the cells that are adjacent to the cell being predicted. For example, a cubic cell can have at least 6 neighbors while a square cell can have at least four neighbors. As further examples, the neighboring cells for a particular cell can be defined as any cells within some threshold distance of the particular cell. The values of the neighboring cells can be input into the machine-learned physics prediction model according to an input structure that informs the model of the spatial nature of the neighboring cells relative to the cell being predicted.

In some implementations, the gradient(s) predicted by the machine-learned physics prediction model for the cell can be a spatial gradient of the one or more properties represented by the physics simulation data (e.g., velocity, temperature, and/or the like). Such a gradient can typically be calculated by taking the difference of values between a neighboring cell and the cell under consideration and dividing it by the distance between the center of the two cells. Thus, the machine-learned model can learn based on the spatial gradients with respect to some or all of the neighboring cells. Then, when it is desired to determine an updated value for a cell, the machine-learned model can predict one or more gradients relative to the one or more neighboring cells. For example, a single gradient can be predicted for the cell relative to all neighbors or a different gradient can be predicted for the cell relative to each neighboring cell.

The computing system can determine an updated value for the cell based on the one or more predicted gradients. In one example, an updated value for the cell can be determined by taking the current value in the cell minus the predicted gradient multiplied by the distance between the cell centers multiplied by an under-relation factor (which may also be referred to as a learning rate). The learning rate can be fixed or can be adaptive. In some implementations, the final updated value for the cell can be the average of respective updated values determined for each of the neighboring cells. Other different update functions can be used as well in addition or alternatively to example function described above.

At 512, the computing system can determine if there are additional cells in the current region. If yes, then method 500 can return to block 506 and consider the next cell. In such fashion, blocks 506-512 can be iteratively performed to determine updated cell values on a cell-by-cell basis.

However, if it is determined at 512 that no additional cells in the current region remain, then method 500 can proceed to 514. At 514, the computing system can determine if an additional change has been received. If not, then method 500 can return to 504 can consider the next region. In such fashion, blocks 504-514 can be iteratively performed to progressively update different regions of cells.

However, if it is determined at 514 that an additional change has been received, then method 500 can return to block 502 and again define the plurality of regions.

In some alternatively implementations, the order of blocks 512 and 514 can be swapped (or an additional decision can be made between blocks 508 and 512). In such fashion, receipt of an additional change can interrupt the update process even within processing of a particular region.

Example Model Arrangements

Figure 6:
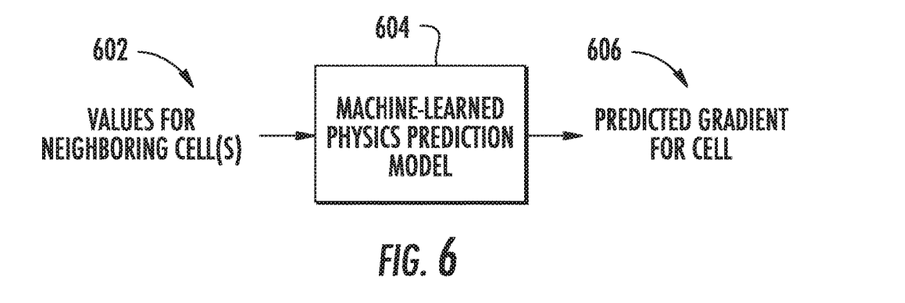
FIG. 6 illustrates a block diagram of an example workflow to generate updated physics simulation data using a machine-learned model in accordance with aspects of the present subject matter.

FIG. 6 illustrates a block diagram of an example workflow to generate updated physics simulation data using a machine-learned physics prediction model 604 in accordance with aspects of the present subject matter. As illustrated in FIG. 6, values for one or more neighboring cells 602 of a particular cell can be provided as an input the model 604. In response, the model 604 can generate one or more predicted gradients 606 for the particular cell.

As examples, the model 604 can be or can otherwise include various machine-learned models such as a random forest classifier; a logistic regression classifier; a kernel ridge regression model; a Bayesian ridge regression; a support vector machine; one or more decision trees; a neural network; and/or other types of models including both linear models and non-linear models. Example neural networks include feed-forward neural networks, recurrent neural networks (e.g., long short-term memory recurrent neural networks), convolutional neural networks, or other forms of neural networks.

Figure 7:
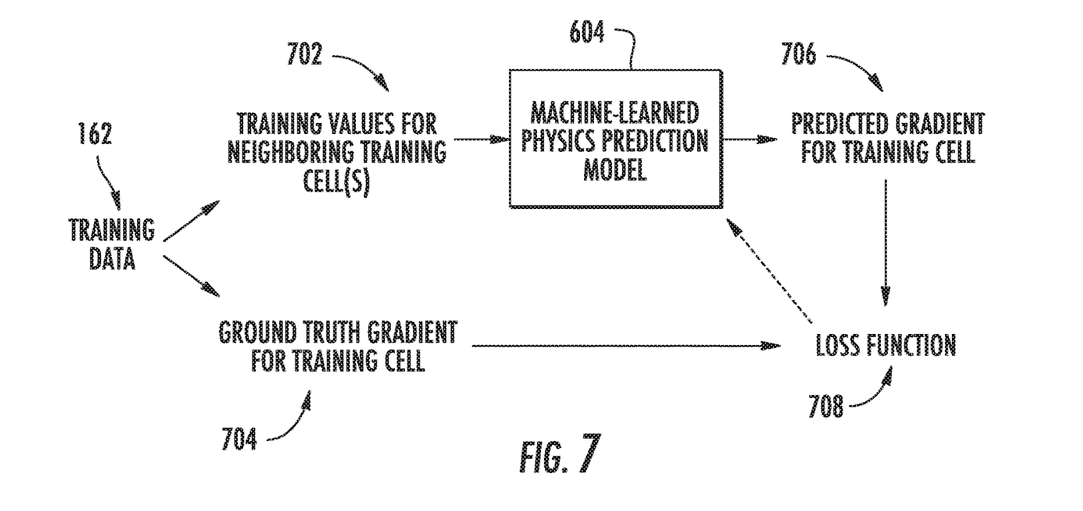
FIG. 7 illustrates a block diagram of an example workflow to train a machine-learned model to generate updated physics simulation data in accordance with aspects of the present subject matter.

FIG. 7 illustrates a block diagram of an example workflow to train the machine-learned physics prediction model 604 to generate updated physics simulation data in accordance with aspects of the present subject matter. For example, training as shown in FIG. 7 can occur prior to inference as shown in FIG. 6.

The model 604 can be trained based on training data 162. The training data 162 can include training values 702 for neighboring training cells of a particular training cell and one or more ground truth gradients 704 for the particular training cell. The training values 702 for the neighboring training cells can be input into the machine-learned physics prediction model 604. In response, the model 604 can generate one or more predicted gradients 706 for the particular training cell.

A loss function 708 can evaluate a difference between the one or more predicted gradients 706 for the particular training cell and the one or more ground truth gradients 704 for the particular training cell. The model 604 can be trained based on the loss function 708. For example, the loss function 708 can be backpropagated through the model 604. For example, parameter(s) of the model 604 can be modified based on a respective gradient of the loss function relative to each parameter.

In one example, the training data 162 can be generated by performing several simulations using a high power physics simulation engine. For example, a first simulation can be performed for a virtual component, a random change can be made to the virtual component, and then a second simulation can be performed for the virtual component after the change.

The ground truth gradients for each training cell can be determined by comparing value(s) for the training cell and its neighbors in the first simulation to value(s) for the training cell and its neighbors in the second simulation.

In another example, the training data 162 can be derived from historical usage of high power physics simulation engines in the design process.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computer-implemented method for enabling expedited design of physical components, the method comprising:
    obtaining, by one or more computing devices, physics simulation data that describes a simulation of one or more physical characteristics of a virtual component within a virtual environment, wherein the virtual component is representative of a physical component, the virtual environment is discretized into a plurality of cells, and the physics simulation data comprises a plurality of values respectively associated with the plurality of cells of the virtual environment;
    visualizing, by the one or more computing devices, the physics simulation data and the virtual environment; and
    for each of one or more iterations:
        receiving, by the one or more computing devices, data descriptive of a change to the virtual component;
        defining, by the one or more computing devices, a plurality of regions within the virtual environment, wherein the plurality of regions comprise at least a first region that contains a first subset of the plurality of cells and a second region that contains a second subset of the plurality of cells, and wherein the second region encompasses the first region, wherein, for each of the one or more iterations, defining, by the one or more computing devices, the plurality of regions within the virtual environment comprises:
            determining, by the one or more computing devices, an amount of compute resources that are currently available; and
            determining, by the one or more computing devices, at least a first size of the first region based at least in part on the amount of compute resources that are currently available;
        generating, by the one or more computing devices, updated physics simulation data for each of the first subset of cells contained in the first region;
        determining, by the one or more computing devices, whether an additional change has been made to the virtual component;
        when it is determined that the additional change has not been made to the virtual component and after completion of said generating updated physics simulation data for each of the first subset of cells contained in the first region: generating, by the one or more computing devices, updated physics simulation data for, at least, each of the second subset of cells contained in the second region but not contained in the first region;
        when it is determined that the additional change has been made to the virtual component prior to completion of said generating updated physics simulation data for each of the first subset of cells contained in the first region: advancing to the subsequent iteration and again generating updated physics simulation data for each of the first subset of cells contained in the first region without generating updated physics simulation data for the second subset of cells included in the second region but not the first region; and
        visualizing, by the one or more computing devices, the updated physics simulation data and the virtual environment.

2. The computer-implemented method of claim 1, wherein:
    the plurality of regions further comprise a third region that comprises a third subset of the plurality of cells, wherein the third region encompasses the second region; and
    the method further comprises, for each of the one or more iterations:
        determining, by the one or more computing devices, whether the additional change has been made to the virtual component prior to completion of said generating updated physics simulation data for, at least, each of the second subset of cells contained in the second region but not contained in the first region; and
        when it is determined that the additional change has not been made to the virtual component prior to completion of said generating updated physics simulation data for, at least, each of the second subset of cells contained in the second region but not contained in the first region:
            generating, by the one or more computing devices, updated physics simulation data for, at least, each of the third subset of cells contained in the third region but not contained in the second region.

3. The computer-implemented method of claim 1, wherein, for each of the one or more iterations, defining, by the one or more computing devices, the plurality of regions within the virtual environment comprises:
    determining, by the one or more computing devices, a frequency of changes to the virtual component; and
    determining, by the one or more computing devices, at least a first size of the first region based at least in part on the frequency of changes to the virtual component.

4. The computer-implemented method of claim 1, wherein, for each of the one or more iterations, at least the first region is centered about a respective location at which the change to the virtual component occurred.

5. The computer-implemented method of claim 1, further comprising:
for each of the one or more iterations:
providing, by the one or more computing devices, a visualization of the virtual environment for display to a user;
wherein receiving, by the one or more computing devices, the data descriptive of the change to the virtual component comprises receiving, by the one or more computing devices, data descriptive of the change to the virtual component made by the user via interaction with the visualization of the virtual environment.

6. The computer-implemented method of claim 5, wherein:
the visualization comprises a virtual reality visualization that is visualized by a virtual reality system; and
the change to the virtual component is made by the user via interaction with the virtual reality system.

7. The computer-implemented method of claim 1, wherein the virtual environment comprises a three-dimensional virtual environment and the plurality of cells comprises a plurality of three-dimensional voxels.

8. The computer-implemented method of claim 1, wherein the physics simulation data comprises a plurality of vectors respectively associated with the plurality of cells.

9. The computer-implemented method of claim 1, wherein the physics simulation data comprises a fluid flow field that results from simulating a flow of a fluid about the virtual component.

10. The computer-implemented method of claim 1, wherein the physics simulation data is descriptive of:
stress experienced by the virtual component;
strain experienced by the virtual component;
an electrical field within the virtual environment;
a magnetic field within the virtual environment; or
thermal transfer associated with the virtual environment.

11. The computer-implemented method of claim 1, wherein, for each of the one or more iterations and for each region, generating, by the one or more computing devices, the updated physics simulation data comprises generating, by the one or more computing devices, the updated physical simulation data on a cell-by-cell basis starting with a first cell in the region that is most upstream in a flow described by the physics simulation data.

12. The computer-implemented method of claim 1, further comprising, for each of the one or more iterations:
identifying, by the one or more computing devices, a plurality of boundary cells associated with an updated exterior of the virtual component after the change to the virtual component;
associating, by the one or more computing devices, normal information with each of the plurality of boundary cells;
identifying, by the one or more computing devices, a plurality of bounded cells that are bounded within the updated exterior of the virtual component after the change to the virtual component; and
setting, by the one or more computing devices, the value for each of the plurality of bounded cells equal to zero.

13. The computer-implemented method of claim 1, wherein generating, by the one or more computing devices, the updated physics simulation data for each of the first and the second subset of cells comprises:
inputting, by the one or more computing devices, the respective values associated with one or more neighboring cells of the cell into the machine-learned physics prediction model;
generating, by the one or more computing devices using the machine-learned physics prediction model, one or more predicted gradients for the cell based on the respective values associated with the one or more neighboring cells of the cell; and
determining, by the one or more computing devices, an updated value for the cell based at least in part on the one or more predicted gradients for the cell.

14. The computer-implemented method of claim 1, wherein defining, by the one or more computing devices, the plurality of regions within the virtual environment comprises:
defining the first region; and
after said generating updated physics simulation data for each of the first subset of cells contained in the first region, separately defining the second region.

15. A computer system, comprising:
one or more processors; and
one or more non-transitory computer-readable media that collectively store instructions that, when executed by the one or more processors, cause the computing system to perform operations, the operations comprising:
obtaining physics simulation data that describes a simulation of one or more physical characteristics of a virtual component within a virtual environment, wherein the virtual component is representative of a physical component, the virtual environment is discretized into a plurality of cells, and the physics simulation data comprises a plurality of values respectively associated with the plurality of cells of the virtual environment;
visualizing, by the one or more computing devices, the physics simulation data and the virtual environment; and
for each of one or more iterations:
receiving data descriptive of a change to the virtual component;
defining a plurality of regions within the virtual environment, wherein the plurality of regions comprise at least a first region that contains a first subset of the plurality of cells and a second region that contains a second subset of the plurality of cells, and wherein the second region encompasses the first region, wherein, for each of the one or more iterations, defining, by the one or more computing devices, the plurality of regions within the virtual environment comprises:
determining, by the one or more computing devices, an amount of compute resources that are currently available; and
determining, by the one or more computing devices, at least a first size of the first region based at least in part on the amount of compute resources that are currently available;
generating updated physics simulation data for each of the first subset of cells contained in the first region;
determining whether an additional change has been made to the virtual component prior to completion of said generating updated physics simulation data for each of the first subset of cells contained in the first region;

when it is determined that the additional change has not been made to the virtual component prior to completion of said generating updated physics simulation data for each of the first subset of cells contained in the first region: generating updated physics simulation data for, at least, each of the second subset of cells contained in the second region but not contained in the first region;

when it is determined that the additional change has been made to the virtual component prior to completion of said generating updated physics simulation data for each of the first subset of cells contained in the first region: advancing to the subsequent iteration and again generating updated physics simulation data for each of the first subset of cells contained in the first region without generating updated physics simulation data for the second subset of cells included in the second region but not the first region; and visualizing, by the one or more computing devices, the updated physics simulation data and the virtual environment.

16. One or more non-transitory computer-readable media that collectively store instructions that, when executed by one or more processors, cause the one or more processors to perform operations, the operations comprising:

obtaining physics simulation data that describes a simulation of one or more physical characteristics of a virtual component within a virtual environment, wherein the virtual component is representative of a physical component, the virtual environment is discretized into a plurality of cells, and the physics simulation data comprises a plurality of values respectively associated with the plurality of cells of the virtual environment;

visualizing, by the one or more computing devices, the physics simulation data and the virtual environment; and for each of one or more iterations:

receiving data descriptive of a change to the virtual component;

defining a plurality of regions within the virtual environment, wherein the plurality of regions comprise at least a first region that contains a first subset of the plurality of cells and a second region that contains a second subset of the plurality of cells, and wherein the second region encompasses the first region, wherein, for each of the one or more iterations, defining, by the one or more computing devices, the plurality of regions within the virtual environment comprises:

determining, by the one or more computing devices, an amount of compute resources that are currently available; and determining, by the one or more computing devices, at least a first size of the first region based at least in part on the amount of compute resources that are currently available;

generating updated physics simulation data for each of the first subset of cells contained in the first region;

determining whether an additional change has been made to the virtual component prior to completion of said generating updated physics simulation data for each of the first subset of cells contained in the first region;

when it is determined that the additional change has not been made to the virtual component prior to completion of said generating updated physics simulation data for each of the first subset of cells contained in the first region: generating updated physics simulation data for, at least, each of the second subset of cells contained in the second region but not contained in the first region;

when it is determined that the additional change has been made to the virtual component prior to completion of said generating updated physics simulation data for each of the first subset of cells contained in the first region: advancing to the subsequent iteration and again generating updated physics simulation data for each of the first subset of cells contained in the first region without generating updated physics simulation data for the second subset of cells included in the second region but not the first region; and visualizing, by the one or more computing devices, the updated physics simulation data and the virtual environment.

* * * * *